(12) United States Patent
Ho

(10) Patent No.: US 11,684,010 B2
(45) Date of Patent: Jun. 27, 2023

(54) BLADE AND LAWN MOWER INCLUDING THE SAME

(71) Applicant: Ping-Tzu Ho, Taichung (TW)

(72) Inventor: Ping-Tzu Ho, Taichung (TW)

( * ) Notice: Subject to any disclaimer, the term of this patent is extended or adjusted under 35 U.S.C. 154(b) by 474 days.

(21) Appl. No.: 17/030,819

(22) Filed: Sep. 24, 2020

(65) Prior Publication Data

US 2021/0084814 A1 Mar. 25, 2021

(30) Foreign Application Priority Data

Sep. 25, 2019 (TW) ................................ 108134702

(51) Int. Cl.
*A01D 34/73* (2006.01)
*A01D 34/67* (2006.01)
*A01D 101/00* (2006.01)

(52) U.S. Cl.
CPC ............ *A01D 34/73* (2013.01); *A01D 34/67* (2013.01); *A01D 2101/00* (2013.01)

(58) Field of Classification Search
CPC ...... A01D 34/67; A01D 34/73; A01D 34/736; A01D 2101/00
See application file for complete search history.

(56) References Cited

U.S. PATENT DOCUMENTS

| | | | | |
|---|---|---|---|---|
| 3,140,575 | A | * | 7/1964 | Ott ........................ A01D 34/73 56/295 |
| 3,191,371 | A | * | 6/1965 | Brewer .................. A01D 34/73 56/295 |
| 3,340,682 | A | * | 9/1967 | Ely ........................ A01D 34/73 56/295 |
| 4,559,769 | A | * | 12/1985 | Seyerle .................. A01D 34/73 56/13.4 |
| 4,938,012 | A | * | 7/1990 | Klima .................... A01D 34/73 56/295 |
| 5,069,025 | A | * | 12/1991 | Iversen .................. A01D 34/73 56/13.4 |
| 5,148,660 | A | * | 9/1992 | Will ....................... A01D 34/73 56/DIG. 17 |
| 5,199,251 | A | * | 4/1993 | Rouse .................... A01D 34/73 56/255 |
| 5,284,006 | A | * | 2/1994 | Sheldon ............... A01D 34/005 56/DIG. 17 |
| 5,299,414 | A | * | 4/1994 | Long ...................... A01D 34/73 56/320.1 |

(Continued)

FOREIGN PATENT DOCUMENTS

TW M526804 U 8/2016

*Primary Examiner* — Sean M Michalski
(74) *Attorney, Agent, or Firm* — Muncy, Geissler, Olds & Lowe, P.C.

(57) ABSTRACT

A blade and a lawn mower including the same is provided. The blade includes a main body, the main body includes a body portion and an assembling portion which is connected to the body portion, the assembling portion is configured for being disposed on a mowing disk of a lawn mower, the mowing disk is rotatable about an axial direction, the body portion includes two side faces opposite to each other, each said side face has a curved section and a plane section, the two side faces define a midline therebetween, and the midline and a vertical plane which is lateral to the axial direction define an angle therebetween.

10 Claims, 6 Drawing Sheets

(56) References Cited

U.S. PATENT DOCUMENTS

| | | | | |
|---|---|---|---|---|
| 5,483,790 A * | 1/1996 | Kuhn | A01D 34/826 | 56/320.1 |
| 5,640,836 A * | 6/1997 | Lingerfelt | A01D 34/736 | 56/255 |
| 5,884,463 A * | 3/1999 | Darzinskis | A01D 34/82 | 56/255 |
| 6,349,475 B1 * | 2/2002 | Buck | A01D 34/001 | 56/13.4 |
| 6,446,420 B1 * | 9/2002 | Worsham | A01D 45/16 | 56/16.8 |
| 6,490,850 B1 * | 12/2002 | Seegert | A01D 34/005 | 56/DIG. 17 |
| 9,480,200 B1 * | 11/2016 | Patridge | A01D 34/66 | |
| 9,888,626 B2 * | 2/2018 | Gilpatrick | A01D 34/733 | |
| 11,172,611 B2 * | 11/2021 | Mayerle | A01D 34/73 | |
| 2004/0098960 A1 * | 5/2004 | Csonka | A01D 34/73 | 56/295 |
| 2008/0010836 A1 * | 1/2008 | Iacona | A01D 42/005 | 30/122 |
| 2010/0000193 A1 * | 1/2010 | De Benedetto | A01D 34/005 | 56/295 |
| 2013/0239538 A1 * | 9/2013 | Gohsman | A01D 34/73 | 56/255 |
| 2013/0269306 A1 * | 10/2013 | Gilpatrick | A01D 34/733 | 56/295 |
| 2014/0041353 A1 * | 2/2014 | MacDonald | A01D 34/733 | 56/12.7 |
| 2014/0150267 A1 * | 6/2014 | Sowell | A01D 34/84 | 30/340 |
| 2015/0047308 A1 * | 2/2015 | Schreiner | A01D 34/73 | 56/289 |
| 2015/0245558 A1 * | 9/2015 | Morabit | A01D 34/4165 | 29/401.1 |
| 2015/0319923 A1 * | 11/2015 | Stoffel | A01D 34/661 | 427/596 |
| 2016/0021817 A1 * | 1/2016 | Rojas | A01D 34/733 | 56/295 |
| 2018/0244377 A1 * | 8/2018 | Chan | B64C 39/024 | |
| 2020/0236847 A1 * | 7/2020 | Nolin | A01D 34/736 | |
| 2020/0352095 A1 * | 11/2020 | Jerez | A01D 34/733 | |
| 2020/0367430 A1 * | 11/2020 | Ito | A01D 34/82 | |
| 2021/0289697 A1 * | 9/2021 | Kurihara | A01D 34/826 | |
| 2021/0321564 A1 * | 10/2021 | Yamaoka | A01D 34/661 | |
| 2022/0240445 A1 * | 8/2022 | Hoffman | A01D 34/82 | |
| 2022/0346311 A1 * | 11/2022 | Southwell | A01D 69/02 | |

* cited by examiner

BLADE AND LAWN MOWER INCLUDING THE SAME

BACKGROUND OF THE INVENTION

Field of the Invention

The present invention relates to a blade and a lawn mower including the same.

Description of the Prior Art

Generally, when mowing, a user may use a lawn mower to save manpower. The user holds the lawn mower to use a machine tool head at an end of the lawn mower to mow, this type of lawn mower is disclosed in TWM526804, the lawn mower has a machine too head, a controlling portion and a rod portion which is connected to and between the machine tool head and the controlling portion, when using the lawn mower, the user holds the controlling portion with one hand to control the operation of the machine tool head, s/he grips on a handle of the rod portion with the other hand, and the handle becomes a fulcrum to lift up the machine tool head to mow.

However, the machine tool head takes a greatest proportion of weight of the lawn mower, so it is energy-wasting to lift the machine tool head off the ground. If the user has a small body size, it would be hard for him/her to operate the lawn mower for a long time, and the mowing efficiency may decrease.

The present invention has arisen to mitigate and/or obviate the afore-described disadvantages.

SUMMARY OF THE INVENTION

The major object of the present invention is to provide a blade and a lawn mower including the same, which allows a user to lift a machine tool head with less strength, so it helps to decrease the burden of the user, increase the mowing efficiency and prevent the user from having occupational injury such as muscle strain due to carrying the lawn mower for a long time.

To achieve the above and other objects, a blade is provided. The blade includes a main body, the main body includes a body portion and an assembling portion which is connected to the body portion, the assembling portion is configured for being disposed on a mowing disk of a lawn mower, the mowing disk is rotatable about an axial direction, the body portion includes two side faces opposite to each other, each said side face has a curved section and a plane section, the two curved sections form a head portion, the two plane sections form a tail portion, on a rotation direction of the mowing disk, the head portion is leading in front end of the tail portion, the head portion is relatively higher than the tail portion, the tail portion is tapered toward a direction away from the head portion, the two side faces define a midline therebetween, the tail portion tilts upward toward the head portion, the midline and a vertical plane which is lateral to the axial direction define an angle therebetween, and the angle is between 10 and 20 degrees.

To achieve the above and other objects, a lawn mower is further provided, including the blade mentioned above. The lawn mower includes a rod portion and a mowing disk, one of two ends of the rod portion has a controlling portion, the other of the two ends of the rod portion has a machine tool head, the controlling portion is used to control the machine tool head to operate, the mowing disk is rotatably disposed in the machine tool head, and the mowing disk has at least one said blade.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
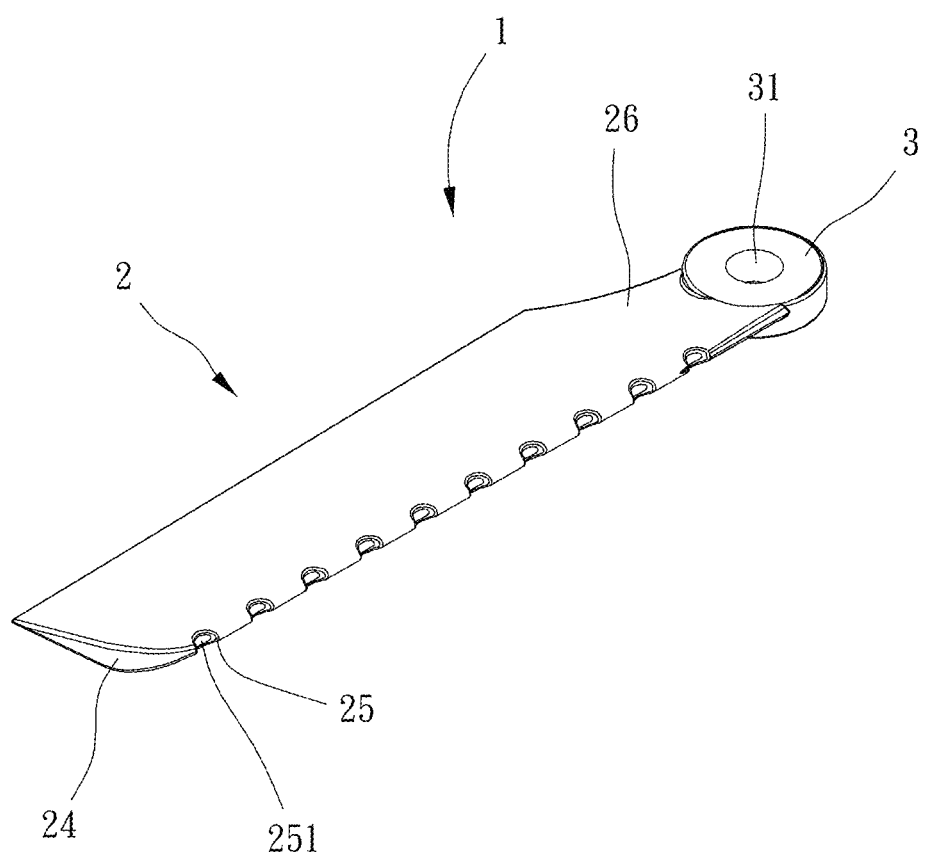
FIG. 1 is a stereogram of a blade of a preferred embodiment of the present invention.
Figure 2:
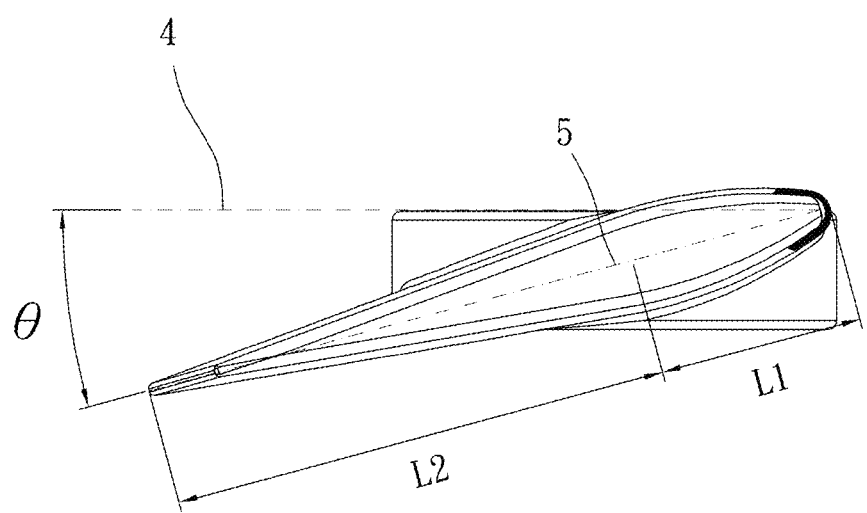
FIGS. 2 and 3 are side views of the preferred embodiment of the present invention.
Figure 3:
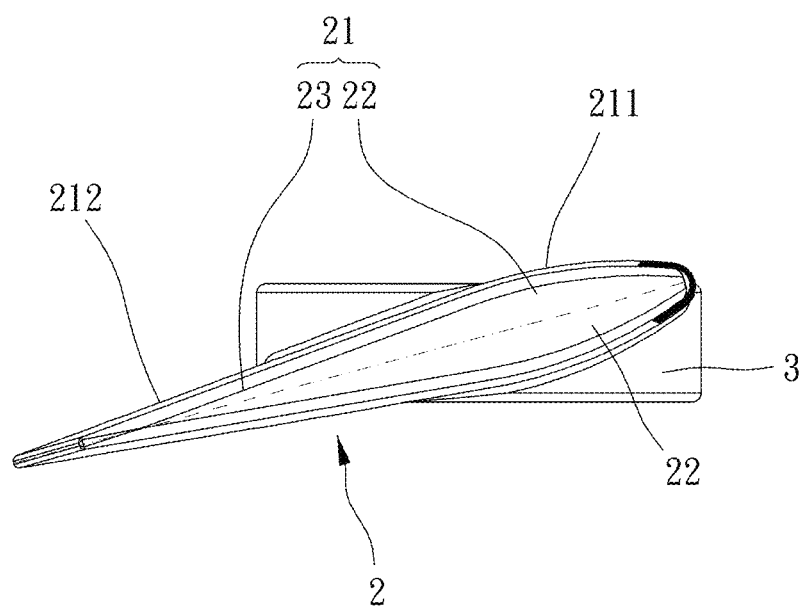
Figure 4:
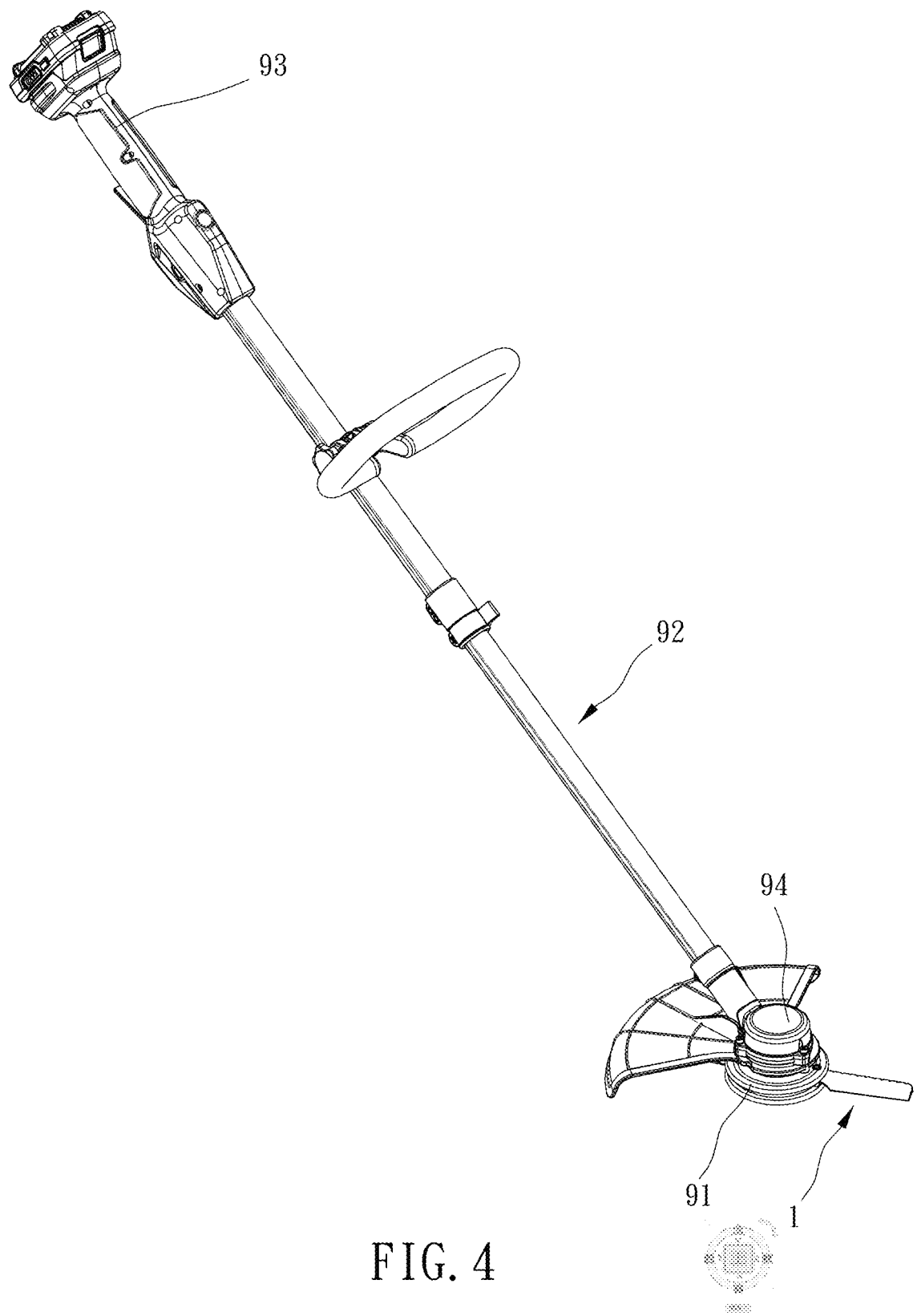
FIG. 4 is a stereogram of a lawn mower of the preferred embodiment of the present invention.
Figure 5:
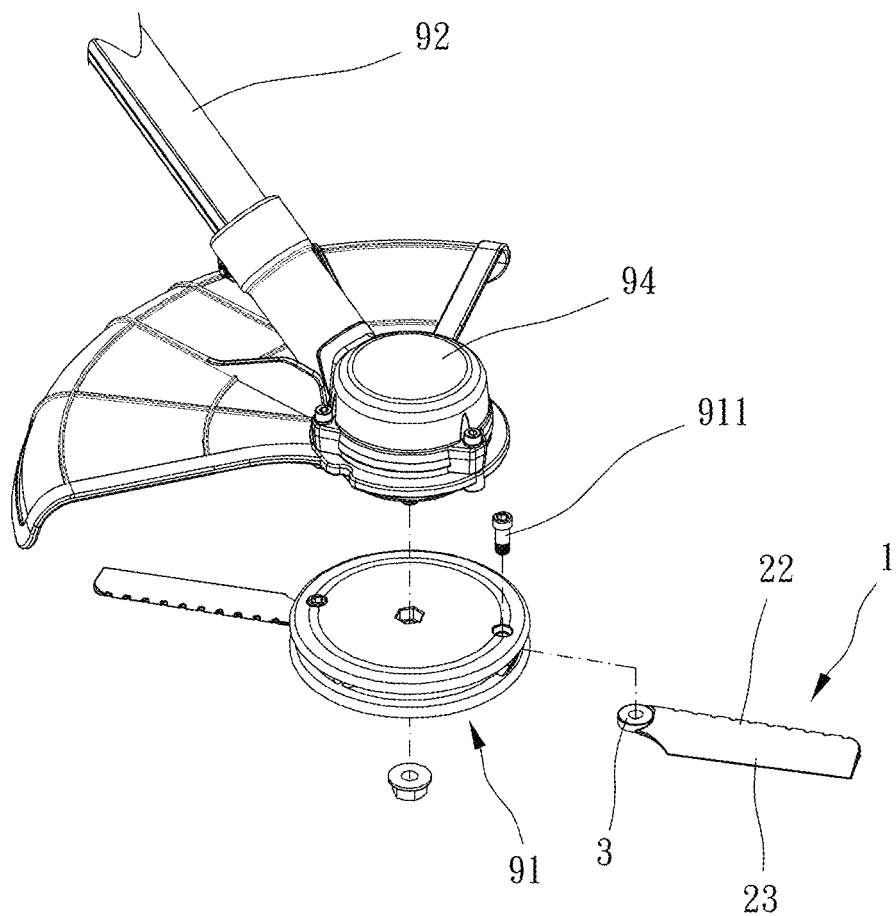
FIG. 5 is a drawing showing an assembly of the preferred embodiment of the present invention.
Figure 6:
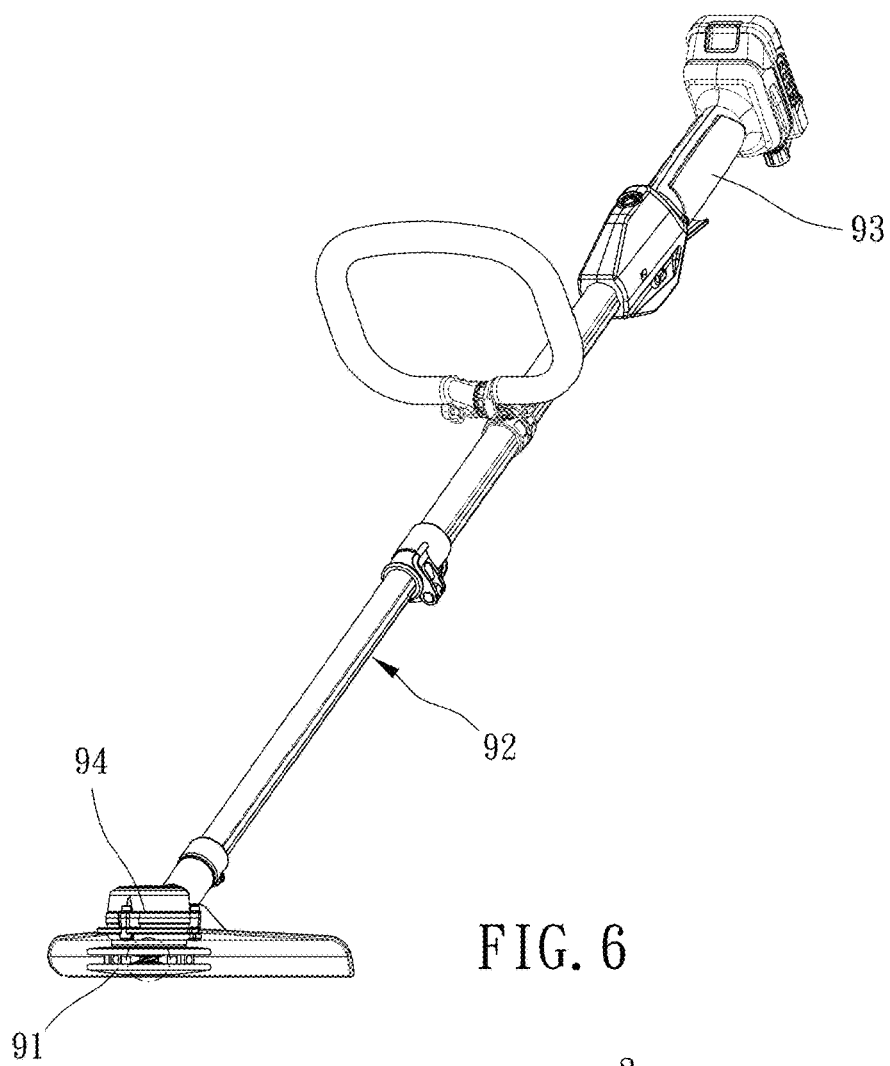
FIG. 6 is a side view of the lawn mower of the preferred embodiment of the present invention.
Figure 7:
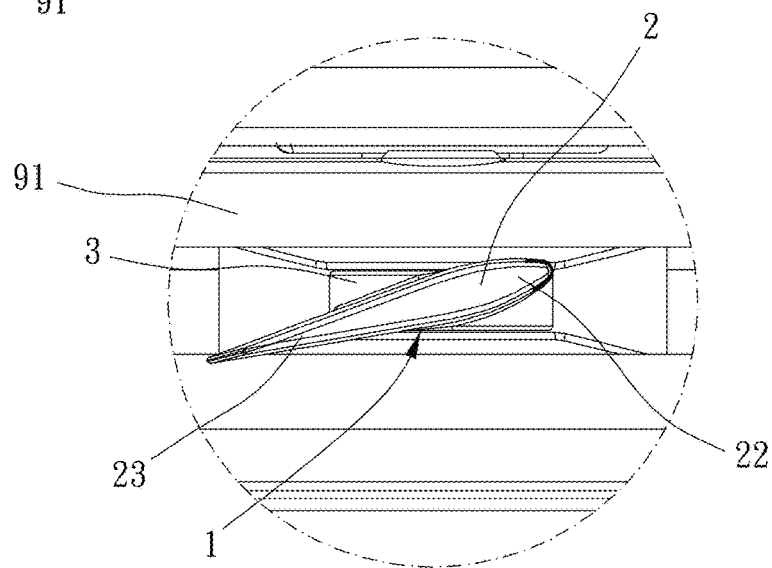
FIG. 7 is a partially enlarged view of FIG. 6.

Please refer to FIGS. 1 to 7 for a preferred embodiment. A blade includes a main body a, the main body 1 includes a body portion 2 and an assembling portion 3 which is connected to the body portion 2, the assembling portion 3 is configured for being disposed on a mowing disk 91 of a lawn mower, the mowing disk 91 rotates about an axial direction, the body portion 2 includes two side faces 21 opposite to each other, each said side face 21 has a curved section 211 and a plane section 212, the two curved sections 211 form a head portion 22, the two plane sections 212 form a tail portion 23, on a rotation direction of the mowing disk 91, the head portion 22 is leading in front of the tail portion 23, the head portion 22 is relatively higher than the tail portion 23, the tail portion 23 is tapered toward a direction away from the head portion 22, the two side faces 21 define a midline 5 therebetween, the tail portion 23 tilts upward toward the head portion 22, the midline 5 and a vertical plane 4 which is lateral to the axial direction define an angle therebetween, and the angle is between 10 and 20 degrees, the two curved sections 211 and the two plane sections 212 are respectively symmetrical to the midline 5, and the two curved sections 211 are convex. In this embodiment, the plane section 212 which faces relatively below tilts upward toward the head portion 22, and an included angle between the two plane sections 212 is between 5 and 15 degrees. In this embodiment, the angle is 15 degrees, and an included angle between the two plane sections 212 is 10 degrees.

Thereby, when the mowing disk 91 of the lawn mower rotates, the angle between the midline 5 and the vertical face 4 is between 10 and 20 degrees, so when driven by the mowing disk 91, a pressure of the side face 21 facing upwards is smaller than a pressure of the side face 21 facing downwards, air flows downwards from above the blade, and the tail portion 23 is tapered toward a direction away from the head portion 22 so that a vortex would be less easier to be generated at an end of the tail portion 23 remote from the head portion 22. Therefore, when the mowing disk 91 rotates, the blade produces an air buoyancy to effectively offset the gravity received by the machine tool head of the lawn mower, so as to decrease the burden of a user, increase the mowing efficiency and prevent the user from having occupational injury such as muscle strain due to carrying the lawn mower for a long time.

Specifically, the assembling portion 3 is pivoted to the mowing disk 91, and an axial direction which the assembling portion 3 rotates about is parallel to an axial direction which the mowing disk 91 rotates about. In this embodiment, the assembling portion 3 has a through hole 31, the assembling portion 3 is rotatably sleeved on a pin member 911 of the mowing disk 91 through the through hole 31, and when the mowing disk 91 rotates, and the head portion 22 collides with an object which is harder (for example, a stone or a metal), the body portion 2 can swing toward a direction which is counter to a rotating direction of the mowing disk 91 to prevent the body portion 2 from being broken.

Preferably, the assembling portion 3 is cylindrical, and the body portion 2 is integrally connected to an external circumferential wall of the assembling portion 4, so it is more convenient to manufacture the assembling portion 3 and the body portion 2. In this embodiment, the blade is made of plastic, and in other embodiments, the blade may be made of rubber or metal.

In addition, an end of the head portion 22 remote from the assembling portion 3 has a chamfer 24 which is arc-shaped to effectively decrease wind resistance and lower wind noise volume, and the chamfer 24 can further prevent the end of the head portion 22 remote from the assembling portion 3 from being broken when colliding with a hard object.

Preferably, an end of the head portion 22 remote from the tail portion 23 has a plurality of recesses 25 which are spacingly arranged along a length side of the body portion 2, the recess 25 is a recessed groove which is semi-circular, the recess 25 further has a protrusion 251 therein, the head portion 22 gradually expands toward the tail portion 23, the plurality of recesses 25 are configured to lower the wind noise volume when the body portion 2 is driven by the mowing disk 91, and the protrusions 251 can effectively cut off weeds.

In this embodiment, a width of the body portion 2 is greater than a radial dimension of the assembling portion 3, an end of the body portion 2 along a longitudinal direction has a tapered section 26, and the tapered section 26 is integrally connected to the assembling portion 3 so that the body portion 2 and the assembling portion 3 are integrally formed.

It is to be noted that a distance of the curved section 211 projecting on the midline 5 is defined as a first distance L1, a distance of the plane section 212 projecting on the midline 5 is defined as a second distance L2, a proportion of the first distance L1 and the second distance L2 is between 1:2 and 1:3, and the head portion 22 gradually expands toward the tail portion 23 to make the body portion 2 streamlined. In this embodiment, the proportion of the first distance and the second distance is 7:17, and a center of gravity of the body portion 2 shifts toward the head portion 22 to provide a greater impact force to cut off weeds and decrease wind resistance.

A lawn mower is further provided, the lawn mower includes the blade mentioned above and further includes a rod portion 92 and a mowing disk 91, one of two ends of the rod portion 92 has a controlling portion 93, the other of the two ends of the rod portion 92 has a machine tool head 94, the controlling portion 93 is used to control the machine tool head 94 to operate, the mowing disk 91 is rotatably disposed in the machine tool head 94, the mowing disk 91 has at least one said blade, and in this embodiment, the mowing disk 91 has at least two said blades.

Given the above, in the blade and the lawn mower including the same, when the mowing disk rotates, the blade produces an air buoyancy to effectively offset the gravity received by the machine tool head, so as to decrease the burden of a user, increase the mowing efficiency and prevent the user from having occupational injury such as muscle strain due to carrying the lawn mower for a long time While we have shown and described various embodiments in accordance with the present invention, it should be clear to those skilled in the art that further embodiments may be made without departing from the scope of the present invention.

What is claimed is:

1. A blade, including:
a main body, including a body portion and an assembling portion which is connected to the body portion, the assembling portion configured for being disposed on a mowing disk of a lawn mower, the mowing disk being rotatable about an axial direction, the body portion including two side faces opposite to each other, each said side face having a curved section and a plane section, the two curved sections forming a head portion, the two plane sections forming a tail portion, on a rotation direction of the mowing disk, the head portion being leading in front of the tail portion, the head portion being relatively higher than the tail portion, the tail portion being tapered toward a direction away from the head portion, the two side faces defining a midline therebetween, the tail portion tilting upward toward the head portion, the midline and a vertical plane which is lateral to the axial direction defining an angle therebetween, the angle being between 10 and 20 degrees, the two curved sections and the two plane sections being respectively symmetrical to the midline, the two curved sections being convex.

2. The blade of claim 1, wherein the assembling portion is pivoted to the mowing disk, and an axial direction which the assembling portion rotates about is parallel to an axial direction which the mowing disk rotates about.

3. The blade of claim 2, wherein the assembling portion has a through hole, and the assembling portion is rotatably sleeved on a pin member of the mowing disk through the through hole.

4. The blade of claim 1, wherein the assembling portion is cylindrical, and the body portion is integrally connected to an external circumferential wall of the assembling portion.

5. The blade of claim 1, wherein an end of the head portion remote from the assembling portion has a chamfer which is arc-shaped.

6. The blade of claim 1, wherein an end of the head portion remote from the tail portion has a plurality of recesses which are spacingly arranged along a length side of the body portion, the recess is a recessed groove which is semi-circular, and the recess further has a protrusion therein.

7. The blade of claim 1, wherein a width of the body portion is greater than a radial dimension of the assembling portion, an end of the body portion along a longitudinal direction has a tapered section, and the tapered section is integrally connected to the assembling portion.

8. The blade of claim 1, wherein the plane section which faces relatively below tilts upward toward the head portion, an included angle between the two plane sections is between 5 and 15 degrees, a distance of the curved section projecting on the midline is defined as a first distance, a distance of the plane section projecting on the midline is defined as a second distance, a proportion of the first distance and the second distance is between 1:2 and 1:3, and the head portion gradually expands toward the tail portion.

9. The blade of claim 3, wherein the angle is 15 degrees, and an included angle between the two plane sections is 10 degrees; a distance of the curved section projecting on the midline is defined as a first distance, a distance of the plane section projecting on the midline is defined as a second distance, a proportion of the first distance and the second distance is 7:17, and the head portion gradually expands toward the tail portion; the assembling portion is cylindrical, and the body portion is integrally connected to an external circumferential wall of the assembling portion; an end of the head portion remote from the assembling portion has a chamfer which is arc-shaped; an end of the head portion remote from the tail portion has a plurality of recesses which are spacingly arranged along a length side of the body portion, the recess is a recessed groove which is semi-circular, and the recess further has a protrusion therein; a width of the body portion is greater than a radial dimension of the assembling portion, an end of the body portion along a longitudinal direction has a tapered section, and the tapered section is integrally connected to the assembling portion.

10. A lawn mower, including the blade of claim 1, further including:
 a rod portion, one of two ends thereof having a controlling portion, the other of the two ends thereof having a machine tool head, the controlling portion being used to control the machine tool head to operate;
 a mowing disk, rotatably disposed in the machine tool head and having at least one said blade.

* * * * *